Nov. 28, 1944.    O. H. BASQUIN    2,363,930
TESTING APPARATUS
Filed Jan. 1, 1943    2 Sheets-Sheet 1
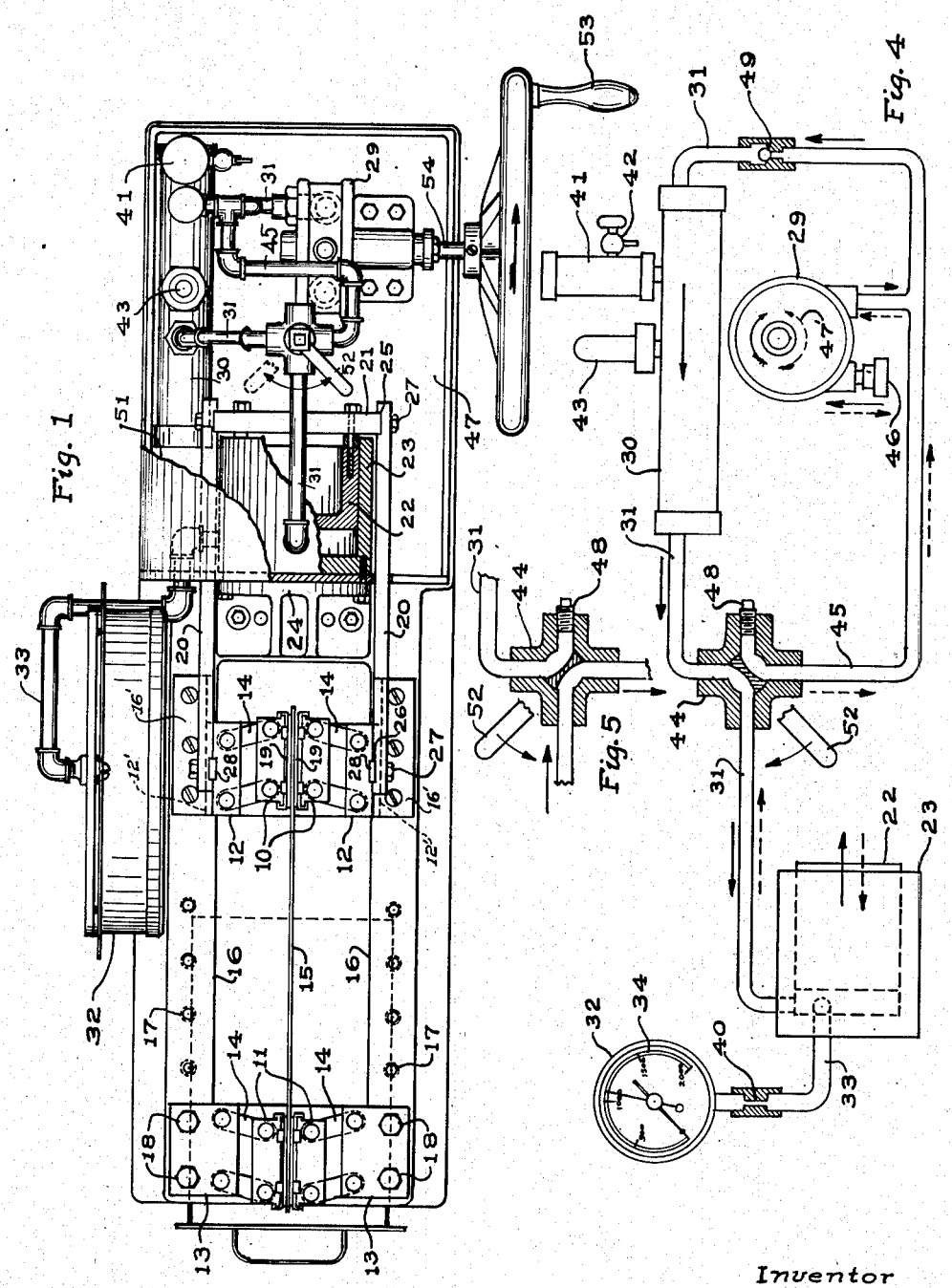
Inventor
Olin H. Basquin
By Roland C Rehm
Attorney Nov. 28, 1944.  O. H. BASQUIN  2,363,930
TESTING APPARATUS
Filed Jan. 1, 1943  2 Sheets-Sheet 2
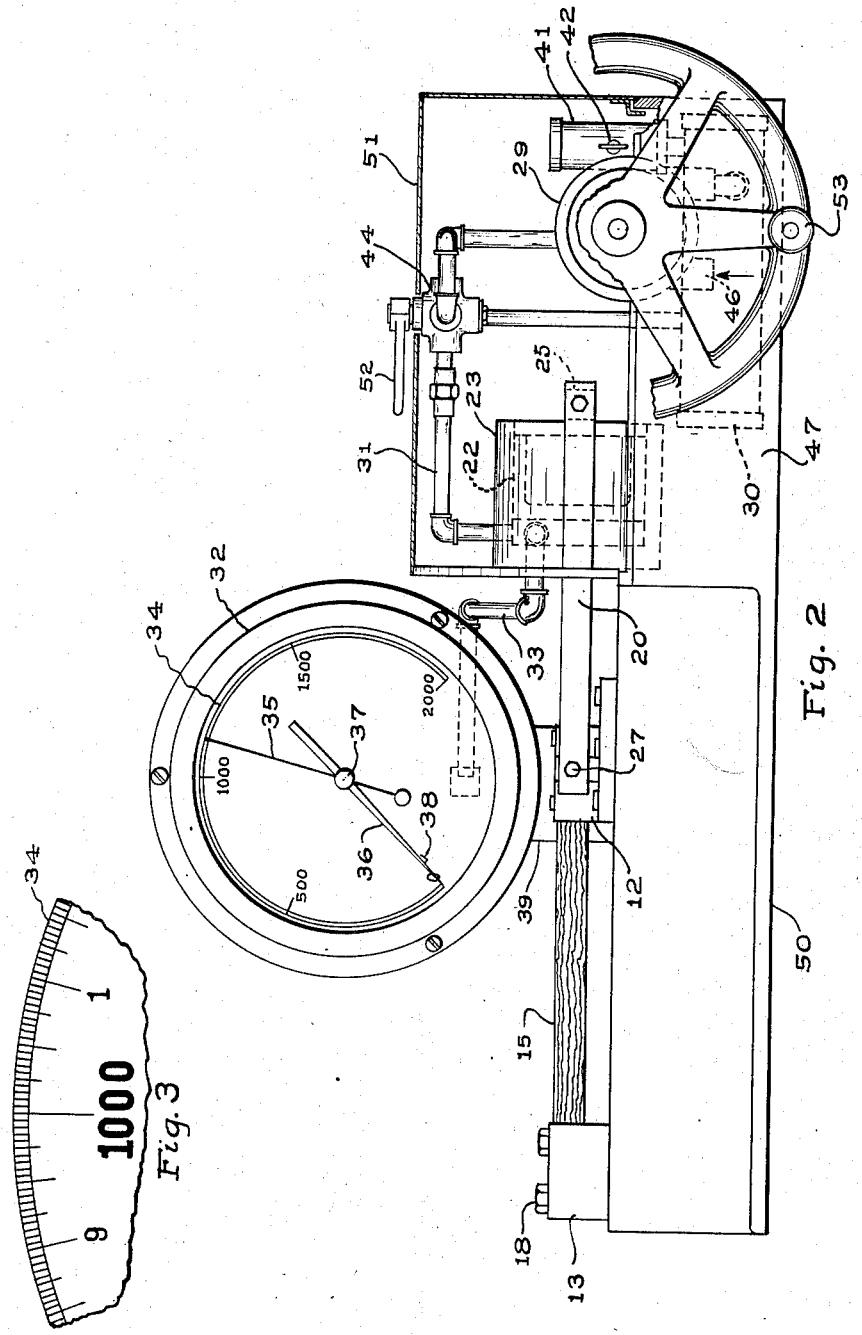
Inventor
Olin H. Basquin
By Roland C Kehm
Attorney Patented Nov. 28, 1944

2,363,930

UNITED STATES PATENT OFFICE 2,363,930

TESTING APPARATUS

Olin H. Basquin, Evanston, Ill., assignor to Streeter-Amet Company, Chicago, Ill., a corporation of Illinois Application January 1, 1943, Serial No. 470,972

4 Claims. (Cl. 73—95)

This invention relates to testing apparatus, and among other objects aims to provide simple apparatus for testing the tensile strength of sheet material such as wood, paper, and analogous materials.

The nature of the invention may be readily understood by reference to one illustrative device embodying the invention and shown in the accompanying drawings.

In said drawings:

Figure 1 is a top plan view of the apparatus certain parts having been broken away to facilitate illustration.

Fig. 2 is a side elevation thereof certain parts having been broken away to facilitate illustration.

Fig. 3 is a full size elevation of the graduations of the gauge;

Fig. 4 is a diagram of the force applying circuit; and

Fig. 5 is a diagrammatic section of a four-way valve used in the hydraulic circuit.

Ordinarily tensile testing machines are not suitable for testing the strength of non-metallic sheet material such as thin wood for plywood and veneer, nor can they be controlled and operated with the facility and speed necessary for testing numerous veneer test specimens. For example, in plywood it is important that the wood veneer or plies have certain minimum tensile strength and that the minimum tensile strength of the material be known. Unlike sheet materials such as metal, the tensile strength of wood and particularly of thin sheets of wood like that used in plywood, although of apparently identical superficial characteristics, may nevertheless vary widely. It is therefore important to make numerous tensile tests of specimens easily, quickly, and reliably.

In the illustrative testing apparatus tension is applied to the test specimens smoothly and under complete control of the operator. This is of the greatest importance in making tensile tests of materials such as wood which may prematurely fracture if the tension be applied irregularly, thereby giving an unreliable indication of the strength of the wood.

The present apparatus is equipped with opposite pairs of specimen-holding jaws 10 and 11, each pair being supported from base members 12 and 13 by parallel links 14 operating on application of tension to move the jaws together, analogously to toggle action, to grip the specimen 15. The pairs of jaws are relatively movable toward and away from each other, one pair 11 in this case being connected through base members 13 with the parallel side frame members 16. The other pair 10 is slidable in the frame members 16 which serve as guides therefor. In the present case guide channels 12' (shown in dotted lines) in which the outer edges of members 12 slide are formed by recessing an edge of plates 16' which are bolted to the frame members 16. To accommodate test specimens of different lengths the stationary pair of jaws 11 may be adjusted longitudinally of the frame members 16, for which purpose the frame members are provided with holes 17 through which the bolts 18 connecting the base members 13 may pass. To accommodate specimens of different thickness, the face plates 19 of the jaws are made removable to permit replacement with face plates of greater or less thickness depending on the thickness of the specimens. The face plates are advantageously roughened on their outer surfaces to improve grip on the specimen.

The slidable pair of jaws 10 is operatively connected to a hydraulic operating piston and cylinder by means of which the jaws are pulled away from the stationary jaws to apply tension to the specimen. In the present case the jaw bases 12 are connected by connecting rods 20 to a cross head 21 bolted across the end of hydraulic piston 22. Hydraulic cylinder 23 is fixed to the framework by means of the cross bracket 24 to which it is bolted.

Connecting rods 20 are recessed or notched as at 25 and 26 adjacent their respective ends to provide shoulders to relieve the attaching bolts 27 of the shear stress which would otherwise be exerted thereon. Base members 12 opposite the respective notches 26 are correspondingly notched and force is transmitted by keys 28 seated in the notches (see Fig. 1).

The hydraulic piston and cylinder are actuated by hydraulic fluid supplied by a pump 29 which may advantageously be a gear or similar pump manually operated by shaft 54 and hand crank 53 so as to be under the complete and sensitive control of the operator. The gear pump, or pump of similar character, supplies pressure fluid under reasonably uniform pressure though it is subject to slight pulsation or fluctuation which is objectionable in testing wood and analogous specimens.

To eliminate fluctuations or pulsations in the pressure, an enlarged chamber 30 is interposed in the line 31 connecting the pump and the hydraulic cylinder 23. The reduction in velocity in the chamber coupled perhaps with the slight compressibility of the oil serves to smooth out or eliminate pressure fluctuations and thereby apply to the specimen a steady pull. An indicator in the form of a pressure gauge 32 of the Bourdon type is connected by means of a line 33 with the hydraulic cylinder to indicate the tension applied to the specimen.

The scale 34 of the gauge (see Fig. 3) is advantageously designed to show total pull on the specimen, such total pull being the product of the cylinder pressure and the area of the piston less the tare pressure required to overcome the friction in the system. The gauge may advantageously be provided with a maximum indicator in the form of a free pointer 35 which is moved by the gauge pointer 36 only in one direction, that is, in the direction of increasing pressures. Upon return of pointer 36 (in response to reduction in pressure), the maximum pointer 35 remains in its position of farthest advance, thereby indicating the maximum pressure exerted on the specimen, being that pressure which resulted in rupture of the specimen. In the present case, the maximum indicator is mounted on the glass face of the gauge and is provided with a projecting knob 37 by means of which it may be manually returned to zero. A projection 38 on the gauge pointer serves to engage pointer 35 and move it forward, being free to leave the pointer upon reduction of pressure.

The gauge is advantageously mounted on a bracket 39 in a position where it may be readily observed by the operator.

A throttling orifice 40 is advantageously interposed in the gauge line 33 to steady the movement of the pointer.

An air trap in the form of a small closed cylinder 41 may advantageously be connected with the line to receive air dissolved or trapped in the oil and which may be released in the system. In the present case the trap is shown connected with the enlarged chamber 30. The air also serves as a cushion further to damp out pressure oscillation in the oil system. The volume of the air in the trap may be controlled by a pet-cock 42 which permits expulsion of any air which fills the cylinder below the level of the pet-cock. Such air may be permitted to escape by opening the cock closing the same when oil starts to flow out. Thus a fairly constant volume of air cushion may be maintained. Another pet-cock may be placed at the top of the air trap so that if desired all air may be expelled from the air trap.

A relief valve 43 is connected with the pressure system to limit the maximum pressure exertable in the system.

In Fig. 4 is illustrated a diagrammatic view of the hydraulic circuit. In applying tension to a specimen the oil follows the circuit indicated by the full line arrows. A four-way valve 44 is advantageously interposed in the supply line and also connected with a return line 45. To apply pressure the valve handle 52 is turned so as to open the passage through the line 31 (see Fig. 4). Upon rotation of the pump, oil is then drawn through the intake 46 (shown provided with an oil strainer and filter, Fig. 4) projecting into the oil reservoir 47 and is moved in the direction of the full line arrows to the hydraulic cylinder. To return the hydraulic piston after a test, the valve handle 52 is moved to close line 31 leading to chamber 30 and pump and to connect the cylinder directly with the pump through return line 45 (see Fig. 5). Upon rotation of the pump in the reverse direction (that indicated by the dotted arrow 47') oil is drawn from the cylinder through line 45 in the direction of the dotted line arrows (Fig. 4) and discharged through orifice 46. The remaining outlet of the four-way valve is preferably blocked by a plug 48 to prevent discharge of oil from chamber 30 under elastic pressure of the compressed air in the air trap. In this connection a check valve 49 is inserted in line 31 on the opposite side of the enlarged chamber 30. Thus the oil in chamber 30 may be maintained under pressure, making it unnecessary to build up pressure preceding the testing of the next specimen.

Broken specimens may be removed from the jaws simply by applying reverse force to the jaws to swing the toggle links 14 in the opposite direction. A fresh test specimen may then be inserted and clamped simply by manually swinging the jaws toward each other. Thereupon valve 44 may be opened to the position shown in Fig. 4 and the pressure increased by rotating the pump. Application of tension to the specimen is thus under the sensitive control of the operator despite the fact that the movement of the hydraulic piston during a test is relatively slight.

The apparatus is advantageously mounted on a base frame 50, one end of which contains the oil reservoir 47. The removable cover 51 of the reservoir is designed to enclose the hydraulic cylinder and the hydraulic system.

The jaws and cylinder may be arranged if desired with the movable jaws uppermost to apply tension in a vertical place. This arrangement is advantageous in calibrating the apparatus since a known weight may be suspended on the upper movable jaws and the gauge adjusted accordingly, or departure from correct gauge readings may be noted.

For some purposes the pump may be motor driven, the driving motor being under the control of the operator.

Obviously the invention is not limited to the details of the illustrative apparatus since these may be variously modified. Moreover, it is not indispensable that all features of the invention be used conjointly since various features may be used to advantage in different combinations and sub-combinations.

Having described my invention, I claim:

1. Tensile testing apparatus for sheet material such as wood veneer comprising in combination spaced pairs of relatively movable jaws for gripping a specimen, a hydraulic cylinder and piston connected with one of said pairs of jaws for applying tension to said specimen, a reversible rotary pump for supplying pressure liquid to said cylinder and to withdraw the same therefrom on reversal of the pump, an enlarged chamber between said pump and cylinder to damp pressure fluctuation in said cylinder, a check valve between pump and chamber to prevent reverse flow, and a reversing valve between chamber and cylinder to connect the latter directly to the pump and to close the line between chamber and cylinder to permit withdrawal of liquid from said cylinder on reversal of the pump without relieving the pressure in said chamber.

2. Tensile testing apparatus for sheet material such as wood veneer comprising in combination spaced pairs of relatively movable jaws for gripping a specimen, a hydraulic cylinder and piston connected with one of said pairs of jaws for applying tension to said specimen, a reversible rotary pump for supplying pressure liquid to said cylinder and to withdraw the same therefrom on reversal of the pump, an elastic cushion chamber between said pump and cylinder to damp pressure fluctuation in said cylinder, a check valve between pump and chamber to prevent reverse flow, and a reversing valve between chamber and cylinder to connect the latter directly to the pump and to close the line between chamber and cylinder to permit withdrawal of liquid from said cylinder on reversal of the pump without relieving the pressure in said chamber.

3. Tensile testing apparatus for sheet material such as wood veneer comprising in combination spaced pairs of relatively movable jaws for gripping a specimen, a hydraulic cylinder and piston connected with one of said pairs of jaws for applying tension to said specimen, a reversible rotary pump for supplying pressure liquid to said cylinder and to withdraw the same therefrom on reversal of the pump, an elastic cushion chamber between said pump and cylinder having therein a limited volume of elastic fluid to damp pressure fluctuations in said cylinder, a check valve between pump and chamber to prevent reverse flow, and a four-way reversing valve between chamber and cylinder to connect the cylinder directly to the pump and to close the line between chamber and cylinder to permit withdrawal of liquid from said cylinder on reversal of the pump without relieving the pressure inside said chamber.

4. Tensile testing apparatus for sheet material comprising in combination spaced pairs of relatively movable jaws for gripping a specimen, a hydraulic cylinder and piston connected with one of said pairs of jaws for applying tension to the specimen, a reversible rotary pump for supplying pressure liquid to said cylinder and for withdrawing the same on reversal of the pump, a pressure gauge connected with said cylinder and having a dial thereon graduated to indicate the total tension applied by said cylinder and piston, said gauge having a maximum indicator movable only under increasing pressure to indicate maximum tension applied to the specimen, and means including a reversing valve and the pump to withdraw the liquid from said cylinder and to return the jaws connected to said cylinder and piston to initial position.

OLIN H. BASQUIN.